United States Patent
Koers et al.

(10) Patent No.: US 9,034,785 B2
(45) Date of Patent: May 19, 2015

(54) ACCELERATOR SOLUTION AND PROCESS FOR CURING CURABLE RESINS

(75) Inventors: Frederik Willem Karel Koers, Epse (NL); Johannes Martinus Gerardus Maria Reijnders, Epe (NL); Auke Gerardus Talma, Bathmen (NL); Johannes Hermanus Ter Beek, Lettele (NL)

(73) Assignee: AKZO NOBEL CHEMICALS INTERNATIONAL B.V., Amersfoort (NL)

( * ) Notice: Subject to any disclaimer, the term of this patent is extended or adjusted under 35 U.S.C. 154(b) by 249 days.

(21) Appl. No.: 13/704,855

(22) PCT Filed: Jun. 14, 2011

(86) PCT No.: PCT/EP2011/059769
§ 371 (c)(1),
(2), (4) Date: Feb. 21, 2013

(87) PCT Pub. No.: WO2011/157673
PCT Pub. Date: Dec. 22, 2011

(65) Prior Publication Data
US 2013/0211013 A1     Aug. 15, 2013

Related U.S. Application Data

(60) Provisional application No. 61/356,191, filed on Jun. 18, 2010.

(30) Foreign Application Priority Data

Jun. 16, 2010 (EP) .................................... 10166163

(51) Int. Cl.
*C08G 63/83* (2006.01)
*C08K 5/00* (2006.01)

(52) U.S. Cl.
CPC .............. *C08G 63/83* (2013.01); *C08K 5/0091* (2013.01)

(58) Field of Classification Search
None
See application file for complete search history.

(56) References Cited

U.S. PATENT DOCUMENTS

| 4,009,150 | A | | 2/1977 | Norling | |
|---|---|---|---|---|---|
| 5,235,010 | A | | 8/1993 | Giovando | |
| 5,520,835 | A | * | 5/1996 | Sivik et al. | ............... 510/220 |
| 2008/0207841 | A1 | * | 8/2008 | Koers et al. | ............... 525/418 |
| 2009/0253833 | A1 | * | 10/2009 | Hage et al. | ............... 524/91 |

FOREIGN PATENT DOCUMENTS

| EP | 0 094 160 A1 | 11/1983 |
|---|---|---|
| EP | 0 909 809 A2 | 4/1999 |
| GB | 1 452 460 | 10/1976 |
| WO | WO 98/39098 A1 | 9/1998 |
| WO | WO 00/60045 * | 10/2000 |
| WO | WO 00/60045 A1 | 10/2000 |
| WO | WO 01/16271 A1 | 3/2001 |
| WO | WO 02/48301 A1 | 6/2002 |
| WO | WO 03/104379 A1 | 12/2003 |
| WO | WO 2008/003492 A1 | 1/2008 |
| WO | WO 2008/003494 A1 | 1/2008 |
| WO | WO 2008/003496 A1 | 1/2008 |
| WO | WO 2008/003497 A1 | 1/2008 |
| WO | WO 2008/003652 A1 | 1/2008 |
| WO | 2011/083309 A1 | 7/2011 |

OTHER PUBLICATIONS

European Search Report for Application No. EP 10 16 6163 dated Sep. 6, 2010.
International Search Report and Written Opinion for International Application No. PCT/EP2011/059769 dated Jul. 21, 2011.

* cited by examiner

*Primary Examiner* — Robert C Boyle
(74) *Attorney, Agent, or Firm* — Alice C. Su

(57) ABSTRACT

Solution suitable for accelerating the cure of a curable resin using a peroxide, said accelerator solution comprising (i) at least one organic solvent, (ii) a manganese salt, a copper salt, or a combination thereof, and (iii) an iron complex of a tetradentate, pentadentate or hexadentate nitrogen donor ligand.

18 Claims, No Drawings

ACCELERATOR SOLUTION AND PROCESS FOR CURING CURABLE RESINS

This application is a national stage filing under 35 U.S.C. §371 of PCT/EP2011/059769, filed Jun. 14, 2011, which claims priority to U.S. Provisional Patent Application No. 61/356,191, filed on Jun. 18, 2010, and European Patent Application No. 10166163.5, filed Jun. 16, 2010, the contents of which are incorporated herein by reference in their entirety.

The present invention relates to a solution suitable for accelerating the cure of a curable resin—such as unsaturated polyester resins, (meth)acrylate resins, and vinyl ester resins—using a peroxide. The invention also relates to the use said solution for curing curable resins.

The accelerator solution is able to accelerate a free radical cure process, which may optionally be a redox system.

The accelerator solution is able to increase the activity of the peroxide at lower temperatures and, consequently, to speed up the cure.

The prior art discloses many different accelerators. U.S. Pat. No. 4,009,150, for instance, discloses iron and copper chelates, the chelates being selected from β-dicarbonyl compounds having an enol content of at least 4% and a dicarbonyl angle of not greater than 120° and β-hydroxy nitrogen-heterocyclic fused aromatics in which the hydroxyl group is attached to a carbon beta to the nitrogen in the adjacent ring. EP 0 094 160 discloses $Cu(dmgH)_2$, Ni(EDTA), $Cu(bdm)_2$, Ni(TETA), Cu(TACTD), $Co(bipy)_3Cl_3$, and $Co(phen)_3Cl_3$ as accelerators.

Mn and Fe-containing accelerators are disclosed in WO 2008/003494, WO 2008/003496, and WO 2008/003797.

Disadvantages of the known accelerators are their toxicity (especially cobalt-based accelerators) and their contribution to colouration of the end product. Furthermore, there is always a need for improving the reactivity and efficiency of the curing system.

The present invention therefore relates to an accelerator solution comprising:
- one or more organic solvents,
- a manganese salt, a copper salt, or a combination thereof, and
- an iron complex of a tetradentate, pentadentate or hexadentate nitrogen donor ligand according to any of the formulae (I), (II), (III), (IV), (V), and (VI) as displayed in claim 1 and further specified below.

The invention further relates to a process for curing a curable resin comprising the step of adding a peroxide and said accelerator solution to a curable resin. This process makes use of a non-toxic accelerator that has excellent reactivity. Furthermore, this process results in end products with limited colouring that may be tack-free. In addition, this process has a high peak exotherm and high cure efficiency.

It is noted that the iron complex has been disclosed in WO 2008/003652 for use as siccative in alkyd-based paints and inks. However, this curing of alkyd resins involves an air drying process; not a free-radical process using peroxides like the process of the present invention.

The accelerator solution according to the present invention comprises a (i) a manganese salt, a copper salt, or a combination thereof, and (ii) an iron complex. In a preferred embodiment, it comprises both a manganese salt and a copper salt.

Suitable manganese salts are manganese halides, nitrate, sulphate, lactate, 2-ethyl hexanoate, acetate, proprionate, butyrate, oxalate, laurate, oleate, linoleate, palmitate, stearate, acetyl acetonate, octanoate, nonanoate, heptanoate, neodecanoate, and naphthenate. Preferably, the manganese salt is selected from manganese chloride, nitrate, sulphate, lactate, 2-ethyl hexanoate, octanoate, nonanoate, heptanoate, neodecanoate, naphthenate, and acetate. Both Mn(II) and Mn(III) salts can be used.

The manganese salt is preferably present in the accelerator solution in an amount of at least 0.01 wt %, more preferably at least 0.1 wt %, and preferably less than 10 wt %, more preferably less than 5 wt %, and most preferably less than 2 wt %, calculated as manganese salt and based on the total weight of the accelerator solution.

Suitable copper salts are copper halides, nitrate, sulphate, lactate, 2-ethyl hexanoate, acetate, proprionate, butyrate, oxalate, laurate, oleate, linoleate, palmitate, stearate, acetyl acetonate, octanoate, nonanoate, heptanoate, neodecanoate, and naphthenate. Preferably, the copper salt is selected from copper chloride, nitrate, sulphate, lactate, 2-ethyl hexanoate, octanoate, nonanoate, heptanoate, neodecanoate, naphthenate, and acetate. Both Cu(I) and Cu(II) salts can be used.

The copper salt is preferably present in the accelerator solution in an amount of at least 0.01 wt %, more preferably at least 0.1 wt %, and preferably less than 10 wt %, more preferably less than 5 wt %, and most preferably less than 2 wt %, calculated as copper salt and based on the total weight of the accelerator solution.

The iron complex preferably comprises a tetradentate or pentadentate nitrogen donor ligand. More preferably, it is an iron complex of a pentadentate nitrogen donor ligand.

The iron complexed by the ligand is selected from Fe(II) and Fe(III).

Preferably, the iron complex has one or more of the forms $[FeLCl_2]$; [FeLCl]Cl; $[FeL(H_2O)](PF_6)_2$; [FeL]Cl_2, [FeLCl]$PF_6$ and $[FeL(H_2O)](BF_4)_2$, wherein L refers to the ligand.

The iron complex is preferably present in the accelerator solution in an amount of at least 0.01 wt %, more preferably at least 0.1 wt %, and preferably less than 10 wt %, more preferably less than 5 wt %, and most preferably less than 2 wt %, calculated as metallic iron (Fe) and based on the total weight of the accelerator solution.

Suitable ligands are listed below. If in the below structures it is referred to, for instance, $C_{1-12}$-alkyl chains, alkyl chains having a length in the range of 1 to 12 carbon atoms, such methyl, ethyl, etc. are meant. These alkyl chains can be branched or linear and may optionally be substituted by heteroatoms like O, S, P, etc. Preferred aryl groups in these structures are (substituted) phenyl groups, unless denoted otherwise.

The Ligand of Formula (I)

The ligand of formula (I), also called a bispidon ligand, has the following structure:

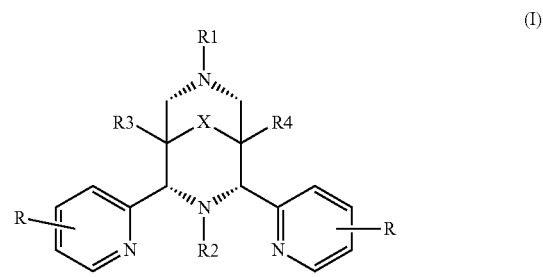

(I)

wherein each R is independently selected from: hydrogen, F, Cl, Br, hydroxyl, $C_{1-4}$-alkylO—, —NH—CO—H, —NH—CO—$C_{1-12}$-alkyl, —$NH_2$, —NH—$C_{1-12}$-alkyl, and $C_{1-12}$-alkyl;

R1 and R2 are independently selected from: $C_{1-24}$-alkyl, $C_{6-10}$-aryl, and a group containing a heteroatom capable of coordinating to a transition metal;

R3 and R4 are independently selected from hydrogen, $C_{1-12}$ alkyl, $C_{1-12}$-alkyl-O—$C_{1-12}$-alkyl, $C_{1-12}$-alkyl-O—$C_{6-10}$-aryl, $C_{6-10}$-aryl, $C_{1-12}$-hydroxyalkyl, and —$(CH_2)_nC(O)OR5$, wherein R5 is independently selected from hydrogen and $C_{1-4}$-alkyl and n ranges from 0 to 4, and X is selected from C=O, —$[C(R6)_2]_y$- wherein y ranges from 0 to 3 and each R6 is independently selected from hydrogen, hydroxyl, $C_{1-12}$-alkoxy, and $C_{1-12}$-alkyl.

In one embodiment, R1 and R2 are selected from a heteroatom capable of coordinating to a transition metal, —$CH_3$, —$C_2H_5$, —$C_3H_7$, —$C_4H_9$, $C_6H_{13}$, $C_8H_{17}$, $C_{12}H_{25}$, and $C_{18}H_{37}$. More preferably, at least one of R1 and R2 is a group containing a heteroatom capable of coordinating to a transition metal and wherein said group is pyridin-2-yl, optionally substituted by —$C_{1-12}$-alkyl or benzyl. Even more preferably, at least one of R1 or R2 is pyridin-2-ylmethyl and the other is selected from —$CH_3$, —$C_2H_5$, —$C_3H_7$, —$C_4H_9$, —$C_6H_{13}$, —$C_8H_{17}$, —$C_{12}H_{25}$, and —$C_{18}H_{37}$.

X is preferably selected from —C=O and —$C(OH)_2$.

Preferably, R3 and R4 are equal and are selected from —C(O)—O—$CH_3$, —C(O)—O—$CH_2CH_3$, —C(O)—O—$CH_2C_6H_5$ and —$CH_2OH$.

A preferred ligand according to formula (I) is dimethyl 2,4-di-(2-pyridyl)-3-methyl-7-(pyridin-2-ylmethyl)-3,7-diaza-bicyclo[3.3.1]nonan-9-one-1,5-dicarboxylate (denoted N2py3o-C1). The iron complex thereof is denoted FeN2py3o-C1 and can be prepared as described in WO 02/48301.

Other examples of suitable ligands according to formula (I) are ligands that differ from N2py3o-C1 by having alkyl chains other than methyl at the 3-position, namely isobutyl (N2py3o-C4), n-hexyl(N2py3o-C6), n-octyl(N2py3o-C8), n-dodecyl(N2py3o-C12), n-tetradecyl(N2py3o-C14), n-octadecyl(N2py3o-C18), and which can be prepared in an analogous manner. Examples of suitable tetradentate ligands are also disclosed in WO00/60045 and examples of suitable pentadentate ligands are disclosed in WO 02/48301 and WO03/104379.

The Ligand of Formula (II)

The ligand according to formula (II) has the following structure:

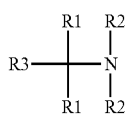

(II)

wherein each R1 and R2 independently represents —$R^4$-$R^5$, R3 represents hydrogen, optionally substituted alkyl, aryl or arylalkyl, or —$R^4$-$R^5$, each $R^4$ independently representing a single bond or optionally substituted alkylene, alkenylene, oxyalkylene, aminoalkylene, alkylene ether, carboxylic ester or carboxylic amide, and each $R^5$ independently representing an optionally N– substituted aminoalkyl group or an optionally substituted heteroaryl group selected from pyridinyl, pyrazinyl, pyrazolyl, pyrrolyl, imidazolyl, benzimidazolyl, pyrimidinyl, triazolyl, and thiazolyl.

Preferably, R1 in the formula represents pyridin-2-yl, while R2 represents pyridin-2-yl-methyl. Preferably, either of R2 and R1 represents 2-amino-ethyl, 2-(N-(m)ethyl)amino-ethyl, or 2-(N,N-di(m)ethyl)amino-ethyl. If substituted, R5 preferably represents 3-methylpyridin-2-yl. R3 preferably represents hydrogen, benzyl or methyl.

Preferred ligands according to formula (II) are N,N-bis (pyridin-2-yl-methyl)-bis(pyridin-2-yl)methylamine) which is denoted as N4Py and is disclosed in WO95/34628, and N,N-bis(pyridin-2-yl-methyl-1,1-bis(pyridin-2-yl)-1-aminoethane, which is denoted as MeN4py and has been disclosed in EP0909809.

The Ligand of Formula (III)

The ligand of formula (III) has the following structure:

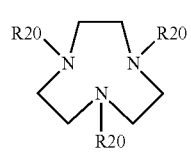

(III)

wherein each R20 is selected from alkyl, cycloalkyl, heterocycloalkyl, heteroaryl, aryl, and arylalkyl groups optionally substituted with a substituent selected from hydroxy, alkoxy, phenoxy, carboxylate, carboxamide, carboxylic ester, sulphonate, amine, alkylamine and $N^+(R^{21})_3$, wherein $R^{21}$ is selected from hydrogen, alkanyl, alkenyl, arylalkanyl, arylalkenyl, oxyalkanyl, oxyalkenyl, aminoalkanyl, aminoalkenyl, alkanyl ether, alkenyl ether, and —$CY_2$—$R^{22}$, in which Y is independently selected from H, $CH_3$, $C_2H_5$, $C_3H_7$ and $R^{22}$ is independently selected from optionally substituted pyridinyl, pyrazinyl, pyrazolyl, pyrrolyl, imidazolyl, benzimidazolyl, pyrimidinyl, triazolyl and thiazolyl groups, and wherein at least one of R20 is —$CY_2$—$R^{22}$;

Preferably $R^{22}$ is selected from optionally substituted pyridin-2-yl, imidazol-4-yl, pyrazol-1-yl, and quinolin-2-yl groups. Most preferably, $R^{22}$ is either a pyridin-2-yl or a quinolin-2-yl.

The Ligand of Formula (IV)

The ligand of formula (IV) has the following structure:

(IV)

wherein Q is independently selected from

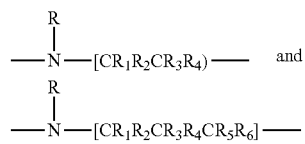

wherein p is 4, R is independently selected from hydrogen, $C_{1-12}$-alkyl, $CH_2CH_2OH$, pyridin-2-ylmethyl, and $CH_2COOH$, or one of R is linked to the N of another Q via an ethylene bridge;

R1, R2, R3, R4, R5 and R6 are independently selected from H, $C_{1-12}$-alkyl, and $C_{1-12}$-alkylhydroxy;

Preferred ligands according to formula (IV) are 1,4,8,11-tetraazacyclotetradecane (cyclam), 1,4,8,11-tetramethyl-1,4, 8,11-tetraazacyclotetradecane (Me4cyclam), 1,4,7,10-tetraazacyclododecane (cyclen), 1,4,7,10-tetramethyl-1,4,7,10- tetraazacyclododecane (Me4 cyclen), and 1,4,7,10-tetrakis (pyridine-2-ylmethyl)-1,4,7,10-tetraazacyclododecane (Py4 cyclen).

The Ligand of Formula (V)

The ligand of formula (V) has the following structure:

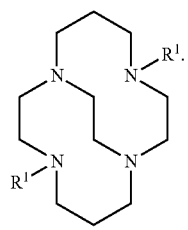

(V)

wherein R1 is independently selected from H and linear or branched, substituted or unsubstituted $C_{1-20}$-alkyl, -alkylaryl, -alkenyl or -alkynyl; and all nitrogen atoms in the macropolycyclic rings are capable of coordinating to transition metals;

Preferably, R1 is methyl, resulting in the ligand 5,12-dimethyl-1,5,8,12-tetraaza-bicyclo[6.6.2]hexadecane of which the complex [Mn(Bcyclam)C12] may be synthesised according to WO98/39098. Other suitable ligands according to formula (V) are also disclosed in WO98/39098.

The ligand of formula (VI)

The ligand of formula (VI) having the following structure:

$(R^{17})(R^{17})N—X—N(R^{17})(R^{17})$ (VI)

wherein X is selected from $—CH_2CH_2—$, $—CH_2CH_2CH_2—$, and $—CH_2C(OH)HCH_2—$; and each $R^{17}$ is independently selected from the group consisting of alkyl, cycloalkyl, heterocycloalkyl, heteroaryl, aryl and arylalkyl groups optionally substituted with a substituent selected from hydroxy, alkoxy, phenoxy, carboxylate, carboxamide, carboxylic ester, sulphonate, amine, alkylamine and $N^+(R^{19})_3$, wherein $R^{19}$ is selected from hydrogen, alkanyl, alkenyl, arylalkanyl, arylalkenyl, oxyalkanyl, oxyalkenyl, aminoalkanyl, aminoalkenyl, alkanyl ether, alkenyl ether, and $—CY_2—R^{18}$, in which Y is independently selected from H, $CH_3$, $C_2H_5$, $C_3H_7$ and $R^{18}$ is independently selected from an optionally substituted heteroaryl group selected from pyridinyl, pyrazinyl, pyrazolyl, pyrrolyl, imidazolyl, benzimidazolyl, pyrimidinyl, triazolyl and thiazolyl; and wherein at least two of $R^{17}$ are $—CY_2—R^{18}$. Preferably, three of $R^{17}$ are $—CY_2—R^{18}$.

The heteroatom donor group is preferably pyridinyl, optionally substituted by $—C_{1-12}$-alkyl.

Other preferred heteroatom donor groups are imidazol-2-yl, 1-methyl-imidazol-2-yl, 4-methyl-imidazol-2-yl, imidazol-4-yl, 2-methyl-imidazol-4-yl, 1-methyl-imidazol-4-yl, benzimidazol-2-yl, and 1-methyl-benzimidazol-2-yl.

Examples of suitable ligands according to formula (VI) are N,N,N',N'-tetra(pyridin-2-yl-methyl)ethylenediamine), N-methyl-tris(pyridin-2-ylmethyl)ethylene-1,2-diamine; N-octyl-tris(pyridin-2-ylmethyl)ethylene-1,2-diamine; N-octadecyl-tris(pyridin-2-ylmethyl)ethylene-1,2-diamine; N-methyl-N,N',N'-tris(3-methyl-pyridin-2-ylmethyl)ethylene-1,2-diamine; N-ethyl-N,N',N'-tris(3-methyl-pyridin-2-ylmethyl)ethylene-1,2-diamine; N-methyl-N,N',N'-tris(5-methyl-pyridin-2-ylmethyl)ethylene-1,2-diamine; N-ethyl-N,N',N'-tris(5-methyl-pyridin-2-ylmethyl)ethylene-1,2-diamine; N-benzyl-N,N',N'-tris(3-methyl-pyridin-2-ylmethyl)ethylene-1,2-diamine; N-benzyl-N,N',N'-tris(5-methyl-pyridin-2-ylmethyl)ethylene-1,2-diamine; N-butyl-N,N',N'-tris(pyridin-2-ylmethyl)ethylene-1,2-diamine; N-octyl-N,N',N'-tris(pyridin-2-ylmethyl)ethylene-1,2-diamine; N-dodecyl-N,N',N'-tris(pyridin-2-ylmethyl)ethylene-1,2-diamine; N-octadecyl-N,N',N'-tris(pyridin-2-ylmethyl)ethylene-1,2-diamine; N-methyl-N,N',N'-tris(imidazol-2-ylmethyl)-ethylenediamine; N-ethyl-N,N',N'-tris(imidazol-2-ylmethyl)-ethylenediamine; N,N'-dimethyl-N,N'-bis(imidazol-2-ylmethyl)-ethylenediamine; N-(1-propan-2-ol)-N,N',N'-tris(imidazol-2-ylmethyl)-ethylenediamine; N-(1-propan-2-ol)-N,N',N'-tris(1-methyl-imidazol-2-ylmethyl)-ethylenediamine; N,N-diethyl-N',N',N'-tris(5-methyl-imidazol-4-ylmethyl)-diethylenetriamine; N-(3-propan-1-ol)-N,N',N'-tris(1-methyl-imidazol-2-ylmethyl)-ethylenediamine; N-hexyl-N,N',N'-tris(imidazol-2-ylmethyl)-ethylenediamine; N-methyl-N,N',N'-tris(benzimidazol-2-ylmethyl)-ethylenediamine; and, N-(3-propan-1-ol)methyl-N,N',N'-tris(benzimidazol-2-ylmethyl)-ethylenediamine. Further suitable ligands of formula (VI) are disclosed in WO02/077145.

The most preferred ligands for use in the process and the accelerator solution according to the present invention are ligands of formula (I) and the following ligands: 5,12-dimethyl-1,5,8,12-tetraaza-bicyclo[6.6.2]hexadecane, 5,12-dibenzyl-1,5,8,12-tetraaza-bicyclo[6.6.2]hexadecane, 1,4,8,11-tetraazacyclotetradecane, 1,4,8,11-tetramethyl-1,4, 8,11-tetraazacyclotetradecane, 1,4,7,10-tetraazacyclododecane, 1,4,7,10-tetramethyl-1,4,7,10-tetraazacyclododecane, 1,4,7,10-tetrakis(pyridine-2-ylmethyl)-1,4,7,10-tetraazacyclododecane, N,N-bis(pyridin-2-ylmethyl)-bis(pyridin-2-yl) methylamine, N,N-bis(pyridin-2-yl-methyl-1,1-bis(pyridin-2-yl)-1-aminoethane, N,N,N',N'-tetra(pyridin-2-ylmethyl) ethylenediamine, N-methyl-tris(pyridin-2-ylmethyl) ethylene-1,2-diamine; N-butyl-N,N',N'-tris(pyridin-2-ylmethyl)ethylene-1,2-diamine; N-octyl-N,N',N'-tris (pyridin-2-ylmethyl)ethylene-1,2-diamine; N-dodecyl-N,N', N'-tris(pyridin-2-ylmethyl)ethylene-1,2-diamine; N-octadecyl-N,N',N'-tris(pyridin-2-ylmethyl)ethylene-1,2-diamine; N-methyl-N,N',N'-tris(3-methyl-pyridin-2-ylmethyl)ethylene-1,2-diamine; N-ethyl-N,N',N'-tris(3-methyl-pyridin-2-ylmethyl)ethylene-1,2-diamine; N-methyl-N,N', N'-tris(5-methyl-pyridin-2-ylmethyl)ethylene-1,2-diamine; N-ethyl-N,N',N'-tris(5-methyl-pyridin-2-ylmethyl)ethylene-1,2-diamine; N-benzyl-N,N',N'-tris(3-methyl-pyridin-2-ylmethyl)ethylene-1,2-diamine; N-benzyl-N,N',N'-tris(5-methyl-pyridin-2-ylmethyl)ethylene-1,2-diamine; N-methyl-N, N',N'-tris(imidazol-2-ylmethyl)ethylenediamine; N-ethyl-N, N',N'-tris(imidazol-2-ylmethyl)ethylenediamine; N,N'-dimethyl-N,N'-bis(imidazol-2-ylmethyl)ethylenediamine; N-(1-propan-2-ol)-N,N',N'-tris(imidazol-2-ylmethyl)ethylenediamine; N-(1-propan-2-ol)-N,N',N'-tris(1-methyl-imidazol-2-ylmethyl)ethylenediamine; N,N-diethyl-N',N',N'-tris(5-methyl-imidazol-4-ylmethyl)diethylenetriamine; N-(3-propan-1-ol)-N,N',N'-tris(1-methyl-imidazol-2-ylmethyl)ethylenediamine; N-hexyl-N,N',N'-tris(imidazol-2-ylmethyl)ethylenediamine; N-methyl-N,N',N'-tris(benzimidazol-2-ylmethyl)ethylenediamine; N-(3-propan-1-ol)methyl-N,N',N'-tris(benzimidazol-2-ylmethyl)ethylenediamine; 1,4-bis(quinolin-2-ylmethyl)-7-octyl-1,4,7-triazacyclononane; 1,4-bis(quinolin-2-ylmethyl)-7-ethyl-1,4,7-triazacyclononane; 1,4-bis(quinolin-2-ylmethyl)-7-methyl-1, 4,7-triazacyclononane; 1,4-bis(pyridyl-2-methyl)-7-octyl-1, 4,7-triazacyclononane; 1,4-bis(pyridyl-2-methyl)-7-ethyl-1, 4,7-triazacyclononane; 1,4-bis(pyridyl-2-methyl)-7-methyl-1,4,7-triazacyclononane; 1,4-bis(pyrazol-1-ylmethyl)-7-octyl-1,4,7-triazacyclononane; 1,4-bis(pyrazol-1-ylmethyl)-7-ethyl-1,4,7-triazacyclononane; 1,4-bis(pyrazol-1-ylmethyl)-7-methyl-1,4,7-triazacyclononane, 3,5-dimethyl (pyrazol-1-ylmethyl)-7-octyl-1,4,7-triazacyclononane; 3,5- dimethyl(pyrazol-1-ylmethyl)-7-ethyl-1,4,7-triazacyclononane; 3,5-dimethyl(pyrazol-1-ylmethyl)-7-methyl-1,4,7-triazacyclononane; 1,4-bis(1-methylimidazol-2-ylmethyl)-7-octyl-1,4,7-triazacyclononane; 1,4-bis(1-methylimidazol-2-ylmethyl)-7-ethyl-1,4,7-triazacyclononane; 1,4-bis(1-methylimidazol-2-ylmethyl)-7-methyl-1,4,7-triazacyclononane; 1,4,7-tris(quinolin-2-ylmethyl)-1,4,7-triazacyclononane; and 1,4,7-tris(pyridin-2-ylmethyl)-1,4,7-triazacyclononane.

The accelerator solution according to the present invention comprises one or more organic solvents (also called phlegmatizers). Suitable solvents include aliphatic hydrocarbon solvents, aromatic hydrocarbon solvents, and solvents that carry an aldehyde, ketone, ether, ester, alcohol, phosphate, or carboxylic acid group. Examples of suitable solvents are aliphatic hydrocarbon solvents such as white spirit and odourless mineral spirit (OMS), aromatic hydrocarbon solvents such naphthenes and mixtures of naphthenes and paraffins, glycols such as ethylene glycol, glycerol, diethylene glycol, dipropylene glycol, and polyethylene glycol; isobutanol; pentanol; 1,2-dioximes, N-methylpyrrolidinone, N-ethyl pyrrolidinone; dimethyl formamide (DMF); dimethylsulfoxide (DMSO); 2,2,4-trimethylpentanediol diisobutyrate (TxIB); phosphorus-containing compounds such as diethyl phosphate, dibutyl phosphate, tributyl phosphate, triethyl phosphate (TEP), dibutyl phosphite, and triethyl phosphite; esters such as dibutyl maleate, dibutyl succinate, ethyl acetate, butyl acetate, methyl acetoacetate, ethyl acetoacetate, mono- and diesters of ketoglutaric acid, pyruvates, and esters of ascorbic acid such as ascorbic palmitate; 1,3-diketones and aldehydes, in particular acetyl acetone, benzoyl acetone, and dibenzoyl methane; mono- and diesters, more in particular diethyl malonate and succinates; 1,2-diketones, in particular diacetyl and glyoxal; butyl dioxytol (also known as diethylene glycol monobutyl ether, formula $nBuOCH_2CH_2OCH_2CH_2OH$), benzyl alcohol, and fatty alcohols. Preferred solvents are triethyl phosphate, dibutyl phosphate, ethylene glycol, diethylene glycol, polyethylene glycol, N-methylpyrrolidone, ethyl acetate, and butyl acetate. A mixture of two or more of the aforementioned solvents may also be used.

The accelerator solution preferably comprises at least 50 wt %, more preferably at least 70 wt %, and preferably less than 95 wt %, more preferably less than 90 wt % of solvent, all based on the total weight of the accelerator solution.

The accelerator solution according to the present invention may optionally contain one or more promoters, water, reducing agents, additives, and/or fillers. Although not essential, the presence of a promoter is preferred, because it allows the iron complex to be used in only very small amounts, thereby making the process of the present invention and the accelerator solution more economically attractive.

There are two important classes of promoters: amines and metal carboxylate salts.

Examples of suitable amines are tertiary amines such as triethyl amine, dimethylaniline, diethylaniline, or N,N-dimethyl-p-toludine (DMPT), polyamines such as 1,2-(dimethylamine)ethane, secondary amines such as diethyl amine, ethoxylated amines such as triethanol amine, dimethylamino ethanol, diethanol amine (DETA), or monoethanol amine. Examples of suitable metal carboxylate salts are the 2-ethyl hexanoates, octanoates, nonanoates, heptanoates, neodecanoates, and naphthenates of the alkali metals Na, K, Li, Ba, and Cs, and of Ce, Mg, Ca, Zn, Cu, Ni, Mn, Sn, Cr, Au, Ag, Pd, and Pt.

The promoters may be added to the accelerator solution as such, or they may be formed in situ. For example, alkali metal 2-ethyl hexanoates can be prepared in situ in the accelerator solution, after addition of the alkali metal hydroxide and 2-ethyl hexanoic acid to the solution.

If one or more stabiliser(s) is/are present in the accelerator solution, their amount preferably is at least 0.01 wt %, more preferably at least 0.1 wt %, and preferably not more than 20 wt %, more preferably not more than 10 wt %, all based on the total weight of the accelerator solution.

Examples of reducing agents are ascorbic acid, sodium formaldehyde sulphoxylate (SFS), reducing sugars like glucose and fructose, oxalic acid, phosphines, phosphites, organic or inorganic nitrites, organic or inorganic sulphites, organic or inorganic sulphides, mercaptanes, amines, and aldehydes, and mixtures thereof. Ascorbic acid, which term in this specification includes L-ascorbic acid and D-isoascorbic acid, is the preferred reducing agent.

If a reducing agent is present in the accelerator solution, it is preferably present in an amount of more than 0.1 wt %, preferably at least 1 wt %, and most preferably at least 5%. It is preferably present in an amount of less than 30 wt %, more preferably less than 20 wt %, all based on the total weight of the accelerator solution.

The accelerator solution may optionally comprise water. If present, the water content of the solution preferably is at least 0.01 wt % and more preferably at least 0.1 wt %. The water content is preferably not more than 50 wt %, more preferably not more than 40 wt %, more preferably not more than 20 wt %, even more preferably not more than 10 wt %, and most preferably not more than 5 wt %, all based on the total weight of the accelerator solution.

The accelerator solution can be prepared by simply mixing the ingredients, optionally with intermediate heating and/or mixing steps. There is no specific order of addition which has to be applied.

The invention also relates to the use of accelerator solution according to the present invention for curing curable resins using a peroxide. Examples of suitable curable resins are (meth)acrylate resins, unsaturated polyester (UP) resins, and vinyl resins. In such curing processes, it is common practice to start with a mixture of the unsaturated polyester or vinyl ester resin and an ethylenically unsaturated monomeric compound. Such mixtures are commercially available.

The curing is generally started by adding the accelerator solution and the peroxide to said mixture. When both the peroxide and the accelerator solution have been added to the curable resin, the resulting mixture is mixed and dispersed. The curing process can be carried out at any temperature from −15° C. up to 250° C., depending on the initiator system, the accelerator system, the compounds to adapt the curing rate, and the resin composition to be cured. The process can be carried out at temperatures up to 180° C., more preferably up to 150° C., most preferably up to 100° C. Preferably, it is carried out at ambient temperatures.

The curing process is commonly applied in applications such as hand lay-up, spray-up, filament winding, resin transfer moulding, resin infusion, resin injection, coatings (e.g. gel-coat and standard coatings), button production, centrifugal casting, corrugated sheets or flat panels, relining systems, kitchen sinks via pouring compounds, SMC, BMC, pultrusion techniques, and the like.

The accelerator solution can be added to the resin or a pre-mix of resin and monomer. It may also be pre-mixed with the optional monomer prior to its addition to the resin. The peroxide can be added directly to the mixture of resin, accelerator solution, and optional monomer. However, the peroxide may also be first mixed with the monomer or resin before the accelerator solution is added. Care is to be taken that the peroxide and the accelerator solution are not pre-mixed, since this would be hazardous.

Various types of resins can be cured in this way. These resins include alkyd resins, unsaturated polyester (UP) resins, vinyl ester resins, (meth)acrylate resins, polyurethanes, and epoxy resins. Preferred resins are (meth)acrylate resins, UP resins and vinyl ester resins.

Suitable UP resins to be cured by the process of the present invention are so-called ortho-resins, iso-resins, iso-npg resins, and dicyclopentadiene (DCPD) resins. Examples of such resins are maleic, fumaric, allylic, vinylic, and epoxy-type resins, bisphenol A resins, terephthalic resins, and hybrid resins.

Vinyl ester resins include acrylate resins, based on, e.g. methacrylate, diacrylate, dimethacrylate, and oligomers thereof.

If desired, the curable resin may be combined with one or more ethylenically unsaturated reactive monomers. Preferred ethylenically unsaturated reactive monomers include styrene and styrene derivatives such as α-methyl styrene, vinyl toluene, indene, divinyl benzene, vinyl pyrrolidone, vinyl siloxane, vinyl caprolactam, stilbene, but also diallyl phthalate, dibenzylidene acetone, allyl benzene, methyl methacrylate, methylacrylate, (meth)acrylic acid, diacrylates, dimethacrylates, acrylamides; vinyl acetate, triallyl cyanurate, triallyl isocyanurate, allyl compounds which are used for optical application (such as (di)ethylene glycol diallyl carbonate), and mixtures thereof.

The amount of ethylenically unsaturated monomer is preferably at least 0.1 wt %, based on the weight of the resin, more preferably at least 1 wt %, and most preferably at least 5 wt %. The amount of ethylenically unsaturated monomer is preferably not more than 50 wt %, more preferably not more than 40 wt %, and most preferably not more than 35 wt %.

In such curing processes, the accelerator solution is generally employed in a conventional amount. Amounts of at least 0.01 wt %, preferably at least 0.1 wt %, and not more than 5 wt %, preferably not more than 2 wt % of the accelerator solution, based on the weight of the resin, are typically used. Peroxides suitable for the curable resins include inorganic peroxides and organic peroxides, such as conventionally used ketone peroxides, peroxyesters, diaryl peroxides, dialkyl peroxides, and peroxydicarbonates, but also peroxycarbonates, peroxyketals, hydroperoxides, diacyl peroxides, and hydrogen peroxide. The skilled person will understand that these peroxides can be combined with conventional additives, for instance phlegmatisers, such as hydrophilic esters and hydrocarbon solvents.

The amount of peroxide to be used in the curing process is preferably at least 0.1 wt %, more preferably at least 0.5 wt %, and most preferably at least 1 wt %. The amount of peroxide is preferably not more than 8 wt %, more preferably not more than 5 wt %, most preferably not more than 2 wt %, all based on the weight of the resin.

Other optional additives may be employed in the curing process according to the invention, such as promoters, fillers, glass fibres, pigments, inhibitors, and promoters.

EXAMPLES

Examples 1-4 and Comparative Examples A-B

Different accelerator solutions were prepared by mixing the ingredients listed in Table 1. The iron complex used was iron complexed with the ligand according to formula (I) wherein R=H, R1=pyridin-2-ylmethyl, R2=methyl, R3=R4=CH$_2$—C(O)OCH$_3$, and X=C=O. The promoter used was potassium 2-ethyl hexanoate.

The accelerator solutions—0.5 phr (per hundred resin) solution—were used to cure an ortho phthalic acid-based unsaturated polyester resin (Palatal® P6 ex DSM resin) at 20° C. with 2 phr methyl ethyl ketone peroxide (Butanox® M50, ex-AkzoNobel).

The curing was analysed by the method of the Society of Plastic Institute (SPI method F/77.1; available from Akzo Nobel Polymer Chemicals). This method involves measuring of the peak exotherm, the time to peak, and the gel time. According to this method, 25 g of a mixture comprising 100 parts of resin, 2 parts of peroxide, and accelerator solution were poured into a test tube and a thermocouple was placed through the enclosure at the centre of the tube. The glass tube was then placed in the oil bath maintained at 20° C. and the time-temperature curve was measured. From the curve the following parameters were calculated:

Gel time (Gt)=time in minutes elapsed between the start of the experiment and 5.6° C. above the bath temperature.

Time to peak (TTP)=time elapsed between the start of the experiment and the moment that the peak temperature is reached.

Peak exotherm (PE)=the maximum temperature that is reached.

The results are listed in the Table 1 below and show that accelerator solutions according to the present invention indeed accelerate the cure compared to solutions comprising only the iron complex.

TABLE 1

|  | Ex. A | Ex. 1 | Ex. 2 | Ex. 3 | Ex. 4 | Ex. B |
|---|---|---|---|---|---|---|
| Fe complex solution (wt %)* | 33.3 | 30 | 30 | 30 | 30 | 100 |
| Cu(I) chloride (wt %) |  |  | 0.5 | 0.3 | 0.25 |  |
| Mn(II) acetate.4 aq (wt %) |  | 0.7 |  | 0.4 |  |  |
| Mn(III) acetylacetonate (wt %) |  |  |  |  | 0.2 |  |
| Polyethylene glycol (wt %) | 66.7 | 60 | 60 | 60 |  |  |
| Diethyl acetoacetamide (wt %) |  |  | 4.0 | 2.0 | 2.0 |  |
| Dibutyl phosphate (wt %) |  |  | 1.0 | 0.5 | 20.2 |  |
| Diethylene glycol (wt %) |  |  |  |  | 46.0 |  |
| Diethylene glycol mono butyl ether (wt %) |  | 6.4 | 2.0 | 4.0 |  |  |
| 2-ethyl hexanoic acid (wt %) |  | 1.5 |  | 0.8 |  |  |
| diethanol amine (wt %) |  | 1.0 | 2.5 | 1.8 | 1.2 |  |
| 2,2'-bipyridine (wt %) |  | 0.4 |  | 0.2 | 0.15 |  |
| total | 100 | 100 | 100 | 100 | 100 | 100 |
| Gt (min) | 10.5 | 7.4 | 7.1 | 2.1 | 6.1 | 19.1 |
| TTP (min) | 19.5 | 13.5 | 13.3 | 4.5 | 11.3 | 30.3 |
| PE (° C.) | 113 | 168 | 168 | 188 | 178 | 86 |

*this solution (Borchi ® OXY-Coat) contains 1 wt % Fe complex, equivalent to 0.08 wt % Fe, in propylene glycol Examples 5-6 and Comparative Examples C-D Example 4 and Comparative Example B were repeated, except that 0.25 and 1.0 phr of the accelerator solution were used. The results are shown in Table 2 below.

TABLE 2

| | solution of Ex. 4 | | | solution of Ex. B | | |
|---|---|---|---|---|---|---|
| Example no. | 5 | 4 | 6 | C | B | D |
| Accelerator solution (phr) | 0.25 | 0.5 | 1.0 | 0.25 | 0.5 | 1.0 |
| Gt (min) | 14.1 | 6.1 | 4.2 | 39.0 | 19.1 | 10.2 |
| TTP (min) | 27.4 | 11.3 | 7.57 | 56.2 | 30.3 | 17.3 |
| PE (° C.) | 74 | 178 | 183 | 45 | 86 | 159 |

The invention claimed is:

1. Accelerator solution comprising (i) at least one organic solvent, (ii) a manganese salt, a copper salt, or a combination thereof, and (iii) an iron complex of a tetradentate tridentate, pentadentate or hexadentate nitrogen donor ligand according to any of the formulae (I), (II), (III), (IV), (V), and (VI), the ligand of formula (I) having the following structure:

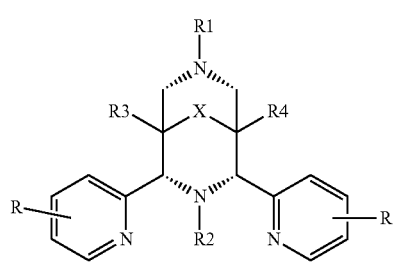

(I)

wherein each R is independently selected from: hydrogen, F, Cl, Br, hydroxyl, $C_{1-12}$-alkylO—, —NH—CO—H, —NH—CO—$C_{1-12}$-alkyl, —$NH_2$, —NH—$C_{1-12}$-alkyl, and $C_{1-12}$-alkyl;

R1 and R2 are independently selected from: $C_{1-24}$-alkyl, $C_{6-10}$-aryl, and a group containing a heteroatom capable of coordinating to a transition metal;

R3 and R4 are independently selected from hydrogen, $C_{1-12}$ alkyl, $C_{1-12}$-alkyl-O—$C_{1-12}$-alkyl, $C_{1-12}$-alkyl-O—$C_{6-10}$-aryl, $C_{6-10}$-aryl, $C_{1-12}$-hydroxyalkyl, and —$(CH_2)_n$C(O)OR5, wherein R5 is independently selected from hydrogen and $C_{1-4}$-alkyl and n ranges from 0 to 4, X is selected from C=O, —$[C(R6)_2]_y$— wherein y ranges from 0 to 3 and each R6 is independently selected from hydrogen, hydroxyl, $C_{1-12}$-alkoxy, and $C_{1-12}$-alkyl;

the ligand of formula (II) having the following structure:

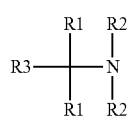

(II)

wherein each R1 and R2 independently represents —$R^4$—$R^5$, R3 represents hydrogen, optionally substituted alkyl, aryl or arylalkyl, or —$R^4$—$R^5$, each $R^4$ independently representing a single bond or optionally substituted alkylene, alkenylene, oxyalkylene, aminoalkylene, alkylene ether, carboxylic ester or carboxylic amide, and each $R^5$ independently representing an optionally N—substituted aminoalkyl group or an optionally substituted heteroaryl group selected from pyridinyl, pyrazinyl, pyrazolyl, pyrrolyl, imidazolyl, benzimidazolyl, pyrimidinyl, triazolyl, and thiazolyl;

the ligand of formula (III) having the following structure:

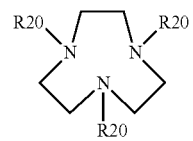

(III)

wherein each R20 is selected from alkyl, cycloalkyl, heterocycloalkyl, heteroaryl, aryl, and arylalkyl groups optionally substituted with a substituent selected from hydroxy, alkoxy, phenoxy, carboxylate, carboxamide, carboxylic ester, sulphonate, amine, alkylamine and $N^+(R^{21})_3$, wherein $R^{21}$ is selected from hydrogen, alkanyl, alkenyl, arylalkanyl, arylalkenyl, oxyalkanyl, oxyalkenyl, aminoalkanyl, aminoalkenyl, alkanyl ether, alkenyl ether, and —$CY_2$—$R^{22}$, in which Y is independently selected from H, $CH_3$, $C_2H_5$, $C_3H_7$ and $R^{22}$ is independently selected from optionally substituted pyridinyl, pyrazinyl, pyrazolyl, pyrrolyl, imidazolyl, benzimidazolyl, pyrimidinyl, triazolyl and thiazolyl groups, and wherein at least one of R20 is —$CY_2$—$R^{22}$;

the ligand of formula (IV) having the following structure:

(IV)

wherein Q is independently selected from

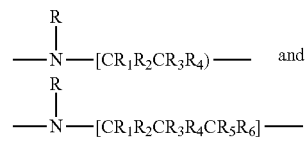

wherein p is 4, R is independently selected from hydrogen, $C_{1-12}$-alkyl, $CH_2CH_2OH$, pyridin-2-ylmethyl, and $CH_2COOH$;

$R_1$, $R_2$, $R_3$, $R_4$, $R_5$ and $R_6$ are independently selected from H, $C_{1-12}$-alkyl, and $C_{1-12}$-alkylhydroxy;

the ligand of formula (V) having the following structure:

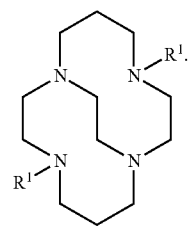

(V)

wherein $R^1$ is independently selected from H and linear or branched, substituted or unsubstituted $C_{1-20}$-alkyl, -alkylaryl, -alkenyl or -alkynyl;

and all nitrogen atoms in the macropolycyclic rings are capable of coordinating to transition metals;

the ligand of formula (VI) having the following structure:

  (VI)

wherein X is selected from —$CH_2CH_2$—, —$CH_2CH_2CH_2$—, and —$CH_2C(OH)HCH_2$—; and each $R^{17}$ is independently selected from the group consisting of alkyl, cycloalkyl, heterocycloalkyl, heteroaryl, aryl and arylalkyl groups optionally substituted with a substituent selected from hydroxy, alkoxy, phenoxy, carboxylate, carboxamide, carboxylic ester, sulphonate, amine, alkylamine and $N^+(R^{19})_3$, wherein $R^{19}$ is selected from hydrogen, alkanyl, alkenyl, arylalkanyl, arylalkenyl, oxyalkanyl, oxyalkenyl, aminoalkanyl, aminoalkenyl, alkanyl ether, alkenyl ether, and —$CY_2$—$R^{18}$, in which Y is independently selected from H, $CH_3$, $C_2H_5$, $C_3H_7$ and $R^{18}$ is independently selected from an optionally substituted heteroaryl group selected from pyridinyl, pyrazinyl, pyrazolyl, pyrrolyl, imidazolyl, benzimidazolyl, pyrimidinyl, triazolyl and thiazolyl; and wherein at least two of $R^{17}$ are —$CY_2$—$R^{18}$.

2. The accelerator solution according to claim 1 wherein the iron complex comprises a nitrogen donor ligand according to formula (I).

3. The accelerator solution according to claim 1 wherein the manganese salt is selected from Mn(II) chloride, Mn(II) nitrate, Mn(II) sulphate, Mn(II) lactate, Mn(II) 2-ethyl hexanoate, Mn(II) octanoate, Mn(II) nonanoate, Mn(II) heptanoate, Mn(II) neodecanoate, Mn(II) naphthenate, and Mn(II) acetate.

4. The accelerator solution according to claim 1 wherein the copper salt is selected from Cu(II)acetate, Cu(I)chloride, Cu(II) octanoate, Cu(II) nonanoate, Cu(II) heptanoate, Cu(II) neodecanoate, and Cu(II) naphthenate.

5. The accelerator solution according to claim 1 comprising both a copper salt and a manganese salt.

6. The accelerator solution according to claim 1 additionally comprising a promoter selected from amines and metal carboxylates.

7. The accelerator solution according to claim 6 wherein the promoter is selected from the group consisting of triethyl amine, dimethylaniline, diethylaniline, N,N-dimethyl-p-toludine, 1,2-(dimethyl amine)ethane, diethyl amine, triethanol amine, dimethylamino ethanol, diethanol amine, monoethanol amine, and the 2-ethyl hexanoates, octanoates, nonanoates, heptanoates, neodecanoates, and naphthenates of Na, K, Li, Ba, Cs, Ce, Mg, Ca, Zn, Cu, Ni, Mn, Sn, Cr, Au, Ag, Pd, and Pt.

8. The accelerator solution according to claim 1 wherein the iron complex is present in an amount of 0.01-10 wt % Fe, based on the total weight of the accelerator solution.

9. The accelerator solution according to claim 1 wherein the manganese salt is present in an amount of 0.01-10 wt %, based on the total weight of the accelerator solution.

10. The accelerator solution according to claim 1 wherein the copper salt is present in an amount of 0.01-10 wt % based on the total weight of the accelerator solution.

11. A method for curing a curable resin comprising contacting a curable resin with an accelerator solution according to claim 1.

12. The method according to claim 11 wherein the curable resin is an unsaturated polyester resin, a (meth)acrylate resin, or a vinyl ester resin.

13. The method according to claim 12 wherein the curable resin is an unsaturated polyester resin selected from the group consisting of ortho-resins, iso-resins, iso-npg resins, and dicyclopentadiene (DCPD) resins.

14. The method according to claim 12 further comprising adding one or more ethylenically unsaturated monomers to the curable resin.

15. The accelerator solution according to claim 5 wherein the manganese salt is selected from Mn(II) chloride, Mn(II) nitrate, Mn(II) sulphate, Mn(II) lactate, Mn(II) 2-ethyl hexanoate, Mn(II) octanoate, Mn(II) nonanoate, Mn(II) heptanoate, Mn(II) neodecanoate, Mn(II) naphthenate, and Mn(II) acetate.

16. The accelerator solution according to claim 5 wherein the copper salt is selected from Cu(II)acetate, Cu(I)chloride, Cu(II) octanoate, Cu(II) nonanoate, Cu(II) hoptanoate, Cu(II) neodecanoate, and Cu(II) naphthenate.

17. The accelerator solution according to claim 16 further comprising a promoter selected from amines and metal carboxylates.

18. The accelerator solution according to claim 17 wherein the promoter is selected from the group consisting of triethyl amine, dimethylaniline diethylaniline, N,N-dimethyl-p-toludine 1,2-(dimethyl amine)ethane diethyl amine, triethanol amine, dimethylamino ethanol, diethanol amine, monoethanol amine, and the 2-ethyl hexanoates, octanoates, nonanoates, heptanoates, neodecanoates, and naphthenates of Na, K, Li, Ba, Cs, Ce, Mg, Ca, Zn, Cu, Ni, Mn, Sn, Cr, Au, Ag, Pd, and Pt.

* * * * *